United States Patent
Ao et al.

(10) Patent No.: US 11,533,007 B2
(45) Date of Patent: Dec. 20, 2022

(54) METHOD AND SYSTEM FOR DETECTING LOGIC LEVEL OF ROTOR OF MOTOR, AND MOTOR

(71) Applicant: GREE ELECTRIC APPLIANCES, INC. OF ZHUHAI, Zhuhai (CN)

(72) Inventors: Wenbin Ao, Zhuhai (CN); Bin Chen, Zhuhai (CN); Shengyu Xiao, Zhuhai (CN); Wenxian Wu, Zhuhai (CN); Yanzhang Wang, Zhuhai (CN); Xiaofei Zhang, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 0 days.

(21) Appl. No.: 17/221,629

(22) Filed: Apr. 2, 2021

(65) Prior Publication Data
US 2021/0226564 A1    Jul. 22, 2021

Related U.S. Application Data

(63) Continuation of application No. PCT/CN2019/103987, filed on Sep. 2, 2019.

(30) Foreign Application Priority Data

Oct. 12, 2018    (CN) .......................... 201811188987.9

(51) Int. Cl.
H02P 6/16    (2016.01)
H02K 29/08    (2006.01)

(52) U.S. Cl.
CPC ............... *H02P 6/16* (2013.01); *H02K 29/08* (2013.01)

(58) Field of Classification Search
CPC ....................................................... H02P 6/16
(Continued)

(56) References Cited

U.S. PATENT DOCUMENTS 5,923,173 A  *  7/1999  Yu ............................. H04N 3/20
                                                        348/E3.039
2003/0123178 A1*  7/2003  Gotou ....................... H02P 6/22
                                                        318/400.11
(Continued)

FOREIGN PATENT DOCUMENTS

CN    1430329 A    7/2003
CN    1862946 A    11/2006
(Continued)

OTHER PUBLICATIONS

Extended European Search Report in counterpart European Patent Application No. 19872137.5, dated Nov. 22, 2021.
(Continued)

*Primary Examiner* — Jorge L Carrasquillo
(74) *Attorney, Agent, or Firm* — Westbridge IP LLC (57) ABSTRACT

A method and a system for detecting a logic level of a rotor of a motor, and a motor are disclosed. The method comprises: obtaining an analog voltage output by a position sensor for a winding of the motor; setting a first commutation voltage and a second commutation voltage; generating a logic level according to the analog voltage, the first commutation voltage and the second commutation voltage; and performing angle correction on the logic level according to a first angle corresponding to the first commutation voltage and a second angle corresponding to the second commutation voltage. The first commutation voltage is a commutation voltage for triggering a rising edge, and the second commutation voltage is a commutation voltage for triggering a falling edge. This method may accurately identify the logic level corresponding to the motor rotor, improve uniformity of a commutation voltage and prevent fluctuations in motor speed.

11 Claims, 4 Drawing Sheets

(58) Field of Classification Search
USPC .................................................. 318/400.38
See application file for complete search history.

(56) References Cited

U.S. PATENT DOCUMENTS

| | | | |
|---|---|---|---|
| 2006/0001419 A1 | 1/2006 | Lam | |
| 2009/0009117 A1* | 1/2009 | Someya | ............... H02P 6/08 318/400.35 |
| 2010/0195784 A1* | 8/2010 | Hirata | ............... H02P 6/06 377/2 |
| 2010/0237814 A1* | 9/2010 | Bi | ............... H02P 6/16 318/400.14 |
| 2013/0113400 A1* | 5/2013 | Kishimoto | ............ H02P 6/188 318/400.14 |
| 2015/0295525 A1 | 10/2015 | Liu et al. | |
| 2018/0167003 A1* | 6/2018 | Lee | ............. H02P 6/15 |

FOREIGN PATENT DOCUMENTS

| | | |
|---|---|---|
| CN | 101841291 A | 9/2010 |
| CN | 103269192 A | 8/2013 |
| CN | 107040260 A | 8/2017 |
| CN | 107276463 A | 10/2017 |
| CN | 107919830 A | 4/2018 |
| CN | 108233789 A | 6/2018 |
| CN | 108400733 A | 8/2018 |
| CN | 109302105 A | 2/2019 |
| EP | 3319224 A1 * | 5/2018 ......... H02P 23/0077 |
| EP | 3319224 A1 | 5/2018 |
| JP | 2009058498 A * | 3/2009 |
| JP | 2011069784 A * | 4/2011 |
| JP | 2011188718 A | 9/2011 |
| JP | 2011196904 A | 10/2011 |
| JP | 2011205792 A | 10/2011 |
| JP | 2013066374 A | 4/2013 |
| JP | 5824660 B2 | 11/2015 |
| WO | 2007007833 A1 | 1/2007 |

OTHER PUBLICATIONS

Written Opinion in corresponding PCT Application No. PCT/CN2019/103987, dated Dec. 3, 2019.
First Office Action in counterpart Chinese Patent Application No. 201811188987.9, dated Nov. 25, 2019.
International Search Report in corresponding PCT Application No. PCT/CN2019/103987, dated Dec. 3, 2019.
Second Office Action in counterpart Chinese Patent Application No. 201811188987.9, dated Jun. 3, 2020.
Notice of Reasons for Refusal issued in counterpart Japanese Patent Application No. 2021-519793, dated Jun. 7, 2022.

* cited by examiner

METHOD AND SYSTEM FOR DETECTING LOGIC LEVEL OF ROTOR OF MOTOR, AND MOTOR

CROSS-REFERENCE TO RELATED APPLICATIONS

The present application is a continuation application of International Application No. PCT/CN2019/103987 filed on Sep. 2, 2019, which claims priority to Chinese Patent Application No. 201811188987.9 filed on Oct. 12, 2018. Both applications are incorporated herein by reference in their entireties.

TECHNICAL FIELD

The present application relates to the field of motor technologies, in particular to a method and a system for detecting a logic level of a rotor of a motor, and a motor.

BACKGROUND

At present, smart home is a trend in recent years, and a development of the smart home is not just a simple development of Internet of Things, many home appliances thereof are also tending to be intelligent and miniaturized respectively. Motors are core components of many home appliances, and only if motors can be miniaturized and intellectualized can their home appliances be miniaturized and intellectualized. When a motor is running, a Hall transition edge identified by a position sensor will be delayed relative to an actual rotation of the motor rotor, that is, an identified logic level corresponding to the motor rotor does not match the actual rotor position, causing the rotor position identified by a chip to be inconsistent with the actual rotor position, thereby causing an error trigger of a commutation voltage, an uneven commutation voltage and fluctuations in motor speed.

Therefore, accurately identifying the logic level corresponding to the motor rotor, improving uniformity of the commutation voltage, and preventing fluctuations in motor speed are urgent problems to be solved in the present field.

SUMMARY

The present application provides a method and a system for detecting a logic level of a rotor of a motor, and a motor, which are used to accurately identify the logic level corresponding to a rotor, so as to improve uniformity of a commutation voltage and prevent fluctuations in motor speed.

In order to solve the above problems, as an aspect of the present application, a method for detecting a logic level of a rotor of a motor is provided, including:

obtaining an analog voltage output by a position sensor for a winding of the motor;

setting a first commutation voltage and a second commutation voltage;

generating a logic level according to the analog voltage, the first commutation voltage and the second commutation voltage; and performing angle correction on the logic level according to a first angle corresponding to the first commutation voltage and a second angle corresponding to the second commutation voltage, wherein the first commutation voltage is a commutation voltage for triggering a rising edge, and the second commutation voltage is a commutation voltage for triggering a falling edge.

Optionally, the obtaining an analog voltage output by a position sensor for a winding of the motor includes:

analog sampling voltage signals output by a Hall sensor as the analog voltage, wherein the position sensor is the Hall sensor.

Optionally, the generating a logic level according to the analog voltage, the first commutation voltage and the second commutation voltage includes:

determining a rising edge of the logic level according to the first commutation voltage, wherein when the analog voltage is in a rising region, a logic level corresponding to a part of the analog voltage greater than the first commutation voltage is set to a high level, and a logic level corresponding to a part of the analog voltage less than the first commutation voltage is set to a low level;

and/or, determining a falling edge of the logic level according to the second commutation voltage, wherein when the analog voltage is in a falling region, a logic level corresponding to a part of the analog voltage greater than the second commutation voltage is set to a high level, and a logic level corresponding to a part of the analog voltage less than the second commutation voltage is set to a low level.

Optionally, the second commutation voltage is equal to a power supply voltage.

Optionally, the performing angle correction on the logic level according to a first angle corresponding to the first commutation voltage and a second angle corresponding to the second commutation voltage includes:

setting an angle corresponding to a falling edge of the logic level to 0°; and advancing an angle corresponding to a rising edge of the logic level by 180°-X, wherein the X is the first angle corresponding to the first commutation voltage.

Optionally, the method for detecting a logic level of a rotor of a motor further includes:

energizing the winding of the motor according to a corrected logic level.

The present application also provides a system for detecting a logic level of a rotor of a motor, including: a processor; and a memory for storing instructions executable by the processor. The processor is configured to:

obtain an analog voltage output by a position sensor for a winding of the motor;

set a first commutation voltage and a second commutation voltage;

generate a logic level according to the analog voltage, the first commutation voltage and the second commutation voltage; and perform angle correction on the logic level according to a first angle corresponding to the first commutation voltage and a second angle corresponding to the second commutation voltage, wherein the first commutation voltage is a commutation voltage for triggering a rising edge, and the second commutation voltage is a commutation voltage for triggering a falling edge.

Optionally, the processor is configured to:

analog sample voltage signals output by a Hall sensor as the analog voltage, wherein the position sensor is the Hall sensor.

Optionally, the processor is configured to:

determine a rising edge of the logic level according to the first commutation voltage, wherein when the analog voltage is in a rising region, a logic level corresponding to a part of the analog voltage greater than the first commutation voltage is set to a high level, and a logic level corresponding to a part of the analog voltage less than the first commutation voltage is set to a low level; and/or determining a falling edge of the logic level according to the second commutation voltage, wherein when the analog voltage is in a falling region, a logic level corresponding to a part of the analog voltage greater than the second commutation voltage is set to a high level, and a logic level corresponding to a part of the analog voltage less than the second commutation voltage is set to a low level.

Optionally, the second commutation voltage is equal to a power supply voltage.

Optionally, the processor is configured to:

set an angle corresponding to a falling edge of the logic level to 0°; and advance an angle corresponding to a rising edge of the logic level by 180°-X, wherein the X is the first angle corresponding to the first commutation voltage.

Optionally, the processor is further configured to: energize the winding of the motor according to a corrected logic level.

The present application also provides a motor, including a processor, a memory and a program stored on the memory that is executable on the processor, wherein the processor executes the program to implement any method provided in the present application.

The present application also provides a motor, including any system provided in the present application.

The present application provides a method and system for detecting a logic level of a rotor of a motor, and a motor, which may accurately identify the logic level corresponding to the motor rotor, improve uniformity of a commutation voltage and prevent fluctuations in motor speed.

BRIEF DESCRIPTION OF DRAWINGS

In order to more clearly describe technical solutions in embodiments of the present application or the prior art, a brief introduction of accompanying drawings that need to be used in descriptions in the embodiments or the prior art will be given below. Obviously, the accompanying drawings in the following descriptions are merely embodiments of the present application. For those of ordinary skill in the art, other drawings may be obtained according to the disclosed drawings without creative work.

DETAILED DESCRIPTION OF THE EMBODIMENTS

In order to make purposes, technical solutions and advantages of the embodiments of the present application clearer, the technical solutions in the embodiments of the present application are clearly and completely described in the following in conjunction with specific embodiments of the present application and the corresponding drawings.

Obviously, the described embodiments are a part, but not all, of the embodiments of the present application. All of other embodiments, obtained by those of ordinary skill in the art based on the embodiments of the present application without creative efforts, shall fall within the protection scope of the present application.

It should be noted that the terms "first", "second" and so forth in the specification and claims of the present application and the above-mentioned drawings are used to distinguish similar objects, and are not necessarily used to describe a specific sequence or order. It should be understood that the data used in this way can be interchanged under appropriate circumstances so that the embodiments of the present application described herein can be implemented in an order other than those illustrated or described herein. In addition, the terms "include" and "have" and any variations of them are intended to cover non-exclusive inclusion. For example, processes, methods, devices, products, or electrical appliances that include a series of steps or units are not necessarily limited to those clearly listed steps or units, but may include other steps or units that are not clearly listed or are inherent to these processes, methods, products, or appliances.

Figure 1:
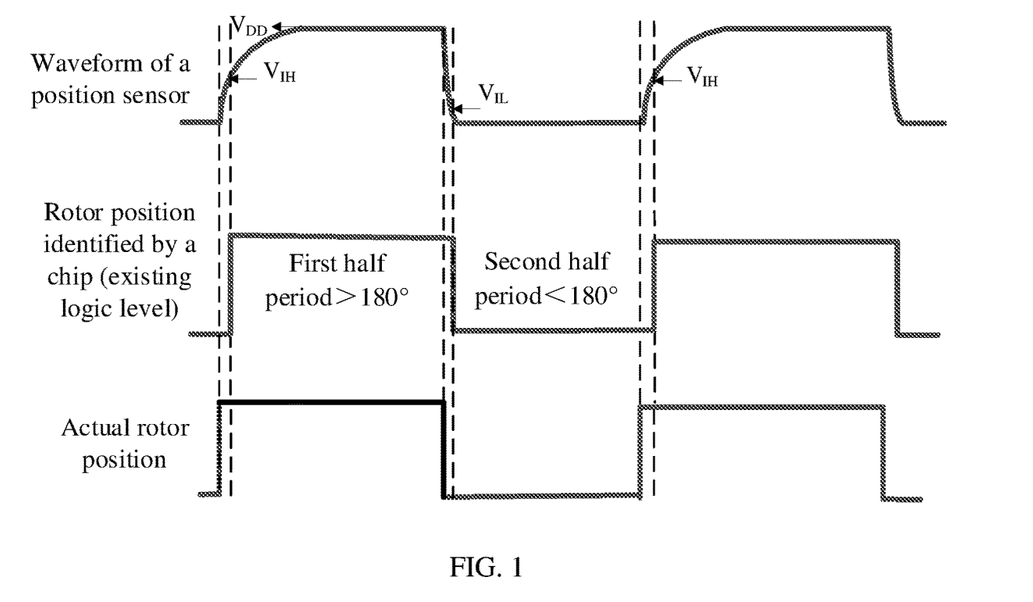
FIG. 1 is a diagram illustrating relationships between a waveform of a position sensor, positions identified by a chip and actual positions of a motor rotor in a related technology.

In related technologies, digital sampling is usually used to obtain a rotation angle of a motor rotor, as shown in FIG. 1. The abscissa in FIG. 1 denotes the rotation angle (not shown in the figure) of the rotor, the ordinate denotes the voltage, and the voltage is expressed as a high level and a low level. The waveform of a position sensor in FIG. 1 is a corresponding relationship between the voltage value actually detected by the sensor and the rotation angle of the motor rotor. A rotor position identified by a chip in FIG. 1 is a logic level generated by using a digital sampling method based on a voltage detected by the position sensor in the related technologies. The rotor position is determined according to the logic level in the related technologies, so the rotor position identified by the chip is consistent with the logic level. In the related technologies, VDD is a power supply voltage and VIH is a judgment threshold level for the chip to digitally identify the high level. That is, if the voltage detected by the position sensor is in a rising region, such as the rising region (a region with an upward trend from left to right) of the leftmost curve of the waveform of the position sensor in FIG. 1, when the voltage detected by the position sensor is less than VIH, the logic level obtained according to the waveform of the position sensor corresponds to a low level, and when the voltage detected by the position sensor is greater than VIH, the logic level obtained according to the waveform of the position sensor corresponds to a high level. VIH corresponds to a rising edge of a logic level (i.e., the above-mentioned logic level) determined by traditional digital sampling. In FIG. 1, VIL is a judgment threshold level for the chip to digitally identify the low level. That is, when the voltage detected by the position sensor is in a falling region (a region with a downward trend from left to right), VIL corresponds to a falling edge of the logic level. The rising and falling edges divide the rotation period of the motor rotor into a first half period and a second half period. In the related technologies, VIH and VIL are artificially defined values and VIH>VIL. Although the logic level can be generated using this method, the rising and falling edges of the logic level do not completely correspond to the rotation of the motor rotor, and have a certain delay, that is, the Hall transition edges are delayed. An angle corresponding to the first half period in FIG. 1 is greater than 180°, and an angle corresponding to the second half period is less than 180°. In the related technologies, an energization control of a winding of a motor according to the logic level causes uneven commutation voltage, resulting in fluctuations in motor speed.

Figure 2:
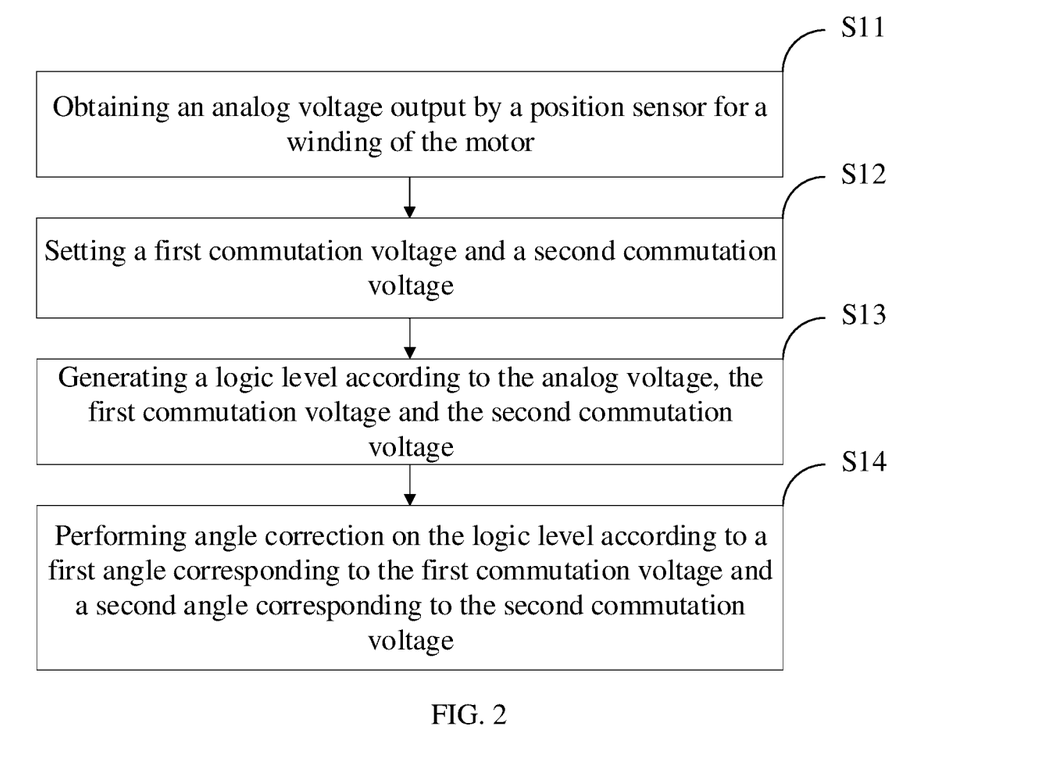
FIG. 2 is a flowchart illustrating a method for detecting a logic level of a rotor of a motor according to an embodiment of the present application.

The present application provides a method for detecting a logic level of a rotor of a motor. The motor may be a brushless direct current motor. The method of the present application may be used when the motor is running at a close constant speed. Please refer to FIG. 2, the method provided in the present application includes:

S11: obtaining an analog voltage output by a position sensor for a winding of the motor;

S12: setting a first commutation voltage and a second commutation voltage;

S13: generating a logic level according to the analog voltage, the first commutation voltage and the second commutation voltage; and S14: performing angle correction on the logic level according to a first angle corresponding to the first commutation voltage and a second angle corresponding to the second commutation voltage.

Specifically, in an embodiment, the motor has a motor winding, and the position sensor may be provided on the motor. The position sensor may be, for example, a Hall sensor on the motor. An analog voltage output by the position sensor is used to characterize the rotation of the motor. In the present application, a method of analog sampling is used to obtain an actual voltage output by the position sensor. The analog voltage is a continuous voltage instead of a digitized voltage in the related technologies. The voltage output by the position sensor in the related technologies is a digital voltage, which is a pulse signal composed of a high level and a low level, that is, the logic level in FIG. 1. In related technologies, the direct digitization of the voltage detected by the position sensor causes the output waveform to be a digital signal instead of an analog signal. A user cannot view the specific information of the voltage, and therefore cannot correct the logic level, so the problem that there is a mismatch between the transition edges, i.e., the rising and falling edges, and the rotation position of the rotor, cannot be solved. Therefore, in the present application, the position of the rotor of the motor is obtained by means of analog sampling, and thus the detailed information about the corresponding voltage can be obtained. In this embodiment, the first commutation voltage is a commutation voltage for triggering a rising edge, similar to VIH in the related technologies, and corresponds to the rising edge of the logic level. The second commutation voltage is a commutation voltage for triggering a falling edge, similar to VIL in the related technologies, and corresponds to the falling edge of the logic level. In the present application, the first commutation voltage and the second commutation voltage respectively correspond to the first angle and the second angle, and the first angle and the second angle may be actual angles detected by the position sensor. Specifically, the method provided in the present application can be used when the motor is nearly rotating smoothly. At this time, an angular velocity of the motor rotation tends to be stable, and the first angle and the second angle can be calculated based on the current angle of the motor and a time difference between the appearances of the first and second commutation voltages. For example, the first angle corresponding to the first commutation voltage can be artificially set, and then the second angle corresponding to the second commutation voltage can be calculated according to the time difference between the first commutation voltage and the second commutation voltage in combination with the angular velocity of the rotor rotation. A difference between angles of the first commutation voltage and the second commutation voltage adjacent to the left side of the first commutation voltage corresponds to an angle value of the second half period. A complete period is 360 degrees, so an angle value of the first half period can also be known. Then the angle correction of the logic level may be performed according to the first angle and the second angle. For example, the rising edge or the falling edge of the logic level can be adjusted so that the angles of the first half period and the second half period are both equal to 180°. In the related technologies, the motor is energized according to the logic level. In the present application, the logic level is adjusted, thereby solving the problem of fluctuations in motor speed caused by uneven commutation voltage.

Optionally, the obtaining an analog voltage output by a position sensor for a winding of the motor includes: analog sampling voltage signals output by a Hall sensor as the analog voltage. Specifically, in this embodiment, the position sensor is a Hall sensor. When the Hall sensor approaches a magnetic conductive object, a magnetic field inside the Hall sensor changes. Due to the Hall effect, different Hall voltages are generated, so that it can be judged whether there is a magnetic conductive object approaching. When the Hall sensor is used to measure the rotation of the motor, the Hall sensor can be fixedly installed. A magnetic steel with good magnetic conductivity is installed on a rotating part of the motor. During the rotation, every time the magnetic steel approaches the Hall sensor, the Hall sensor considers that the motor has completed one rotation, so as to monitor the rotation of the motor.

Optionally, the generating a logic level according to the analog voltage, the first commutation voltage and the second commutation voltage includes: determining a rising edge of the logic level according to the first commutation voltage, wherein when the analog voltage is in a rising region, a logic level corresponding to a part of the analog voltage greater than the first commutation voltage is set to a high level, and a logic level corresponding to a part of the analog voltage less than the first commutation voltage is set to a low level;

and/or, determining a falling edge of the logic level according to the second commutation voltage, wherein when the analog voltage is in a falling region, a logic level corresponding to a part of the analog voltage greater than the second commutation voltage is set to a high level, and a logic level corresponding to a part of the analog voltage less than the second commutation voltage is set to a low level.

Specifically, in this embodiment, the analog voltage is converted into a logic level. A low voltage part of the analog voltage corresponds to a low level part of the logic level, and a high voltage part of the analog voltage corresponds to a high level part of the logic level. A part of the analog voltage that rises from low voltage to high voltage is the rising region, such as a rising arc part, where the VIH located, in the waveform of the position sensor in FIG. 1, which shows the change of each waveform from left to right with time increasing. A part of the analog voltage that decreases from high level to low level is the falling region, such as a falling arc part, where the VIH located, in the waveform of the position sensor in FIG. 1. The first commutation voltage corresponds to the rising edge of the logic level, and the second commutation voltage corresponds to the falling edge of the logic level. The analog voltage can be converted into a digital logic level by setting the first commutation voltage and the second commutation voltage. The logic level only includes high level and low level. The transition edge of a transition from low level to high level is a rising edge, and the transition edge of a transition from high level to low level is a falling edge. The method of generating logic levels used in this part can be consistent with the method of generating logic levels in the related technologies.

Optionally, the second commutation voltage is equal to a power supply voltage. The power supply voltage is VDD in FIG. 1, which is the maximum voltage that the position sensor can detect. Please refer to FIG. 3. Because the second commutation voltage is set to the power supply voltage VDD, after the angle correction is performed on the logic level in the present application, the falling edge will be consistent with the actual rotor position, thereby preventing a failure to accurately control the energization of the winding of the motor resulted from the inconsistency between the falling edge and the actual rotor position, and preventing fluctuations in motor rotation.

Specifically, the performing angle correction on the logic level according to a first angle corresponding to the first commutation voltage and a second angle corresponding to the second commutation voltage includes:

setting an angle corresponding to a falling edge of the logic level to 0°; and advancing an angle corresponding to a rising edge of the logic level by 180°-X, wherein the X is the first angle corresponding to the first commutation voltage.

Figure 3:
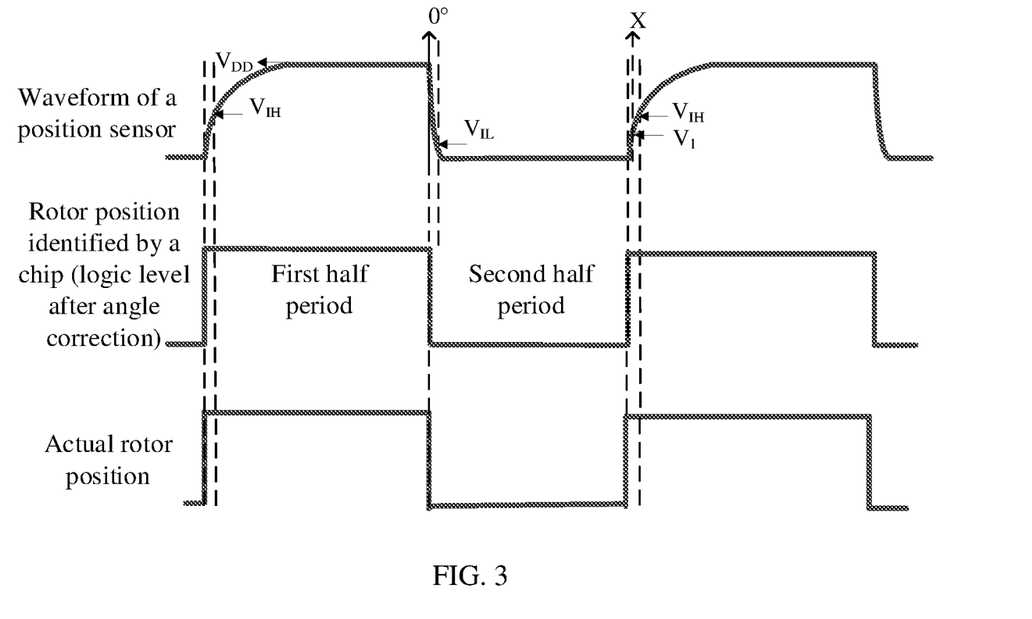
FIG. 3 is a diagram illustrating relationships between a waveform of a sensor, positions identified by a chip and actual positions of a motor rotor according to the present application.

Specifically, please continue to refer to FIG. 3, in the present application, because the second commutation voltage is set as a working voltage VDD, it is ensured that the falling edge of the logic level is consistent with the actual rotor position. In order to ensure that the rising edge of the logic level is consistent with the actual rotor position, the first commutation voltage V1 is set. V1 can be smaller than VIH in the related technologies. A motor rotor angle corresponding to the falling edge in the logic level is 0°, and the angle corresponding to V1 is X, so an angle difference between the second half period and the first angle is 180°-X. In order to make the angle of the second half period equal to 180°, an angle corresponding to the rising edge of the logic level is set to be advanced by 180°-X, so that the rising edge of the logic level can also coincide with a rising edge of the actual rotor position, and thus the angles of the first half period and the second half period are both equal to 180°. Optionally, the method further includes: energizing the winding of the motor according to a corrected logic level. In the present application, the actual rotor position is consistent with the logic level, which solves the problem of uneven commutation voltage caused by the delay of the transition edges in the related technologies, avoids fluctuations in the rotation of the motor, realizes a uniform commutation current of the motor, and ensures a stable motor speed.

Figure 4:
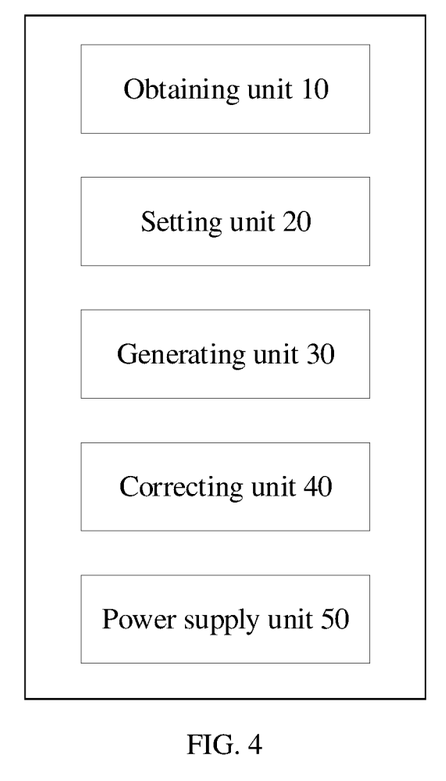
FIG. 4 is a composition diagram illustrating a system for detecting a logic level of a rotor of a motor according to an embodiment of the present application.

The present application also provides a system for detecting a logic level of a rotor of a motor. The motor may be a brushless direct current motor. Please refer to FIG. 4, the system provided by the present application includes:

an obtaining unit 10, configured to obtain an analog voltage output by a position sensor for a winding of the motor;

a setting unit 20, configured to set a first commutation voltage and a second commutation voltage;

a generating unit 30, configured to generate a logic level according to the analog voltage, the first commutation voltage and the second commutation voltage; and a correcting unit 40, configured to perform angle correction on the logic level according to a first angle corresponding to the first commutation voltage and a second angle corresponding to the second commutation voltage.

Specifically, in the present application, the method of analog sampling is used to obtain the voltage output by the position sensor. The analog voltage is a continuous voltage instead of a digitized voltage in the related technologies. The voltage output by the position sensor in the related technologies is a digital voltage, which is a pulse signal composed of a high level and a low level, that is, the logic level determined by traditional sampling in FIG. 1. In related technologies, the direct digitization of the voltage detected by the position sensor causes the output waveform to be a digital signal instead of an analog signal. An user cannot view the specific information of the voltage, and therefore cannot correct the logic level, so the problem that there is a mismatch between the transition edges, i.e., the rising and falling edges, and the rotation position of the rotor, cannot be solved. Therefore, in the present application, the position of the rotor of the motor is obtained by means of analog sampling, and thus the detailed information about the voltage corresponding to the rotor can be obtained. In this embodiment, the first commutation voltage is a commutation voltage for triggering a rising edge, similar to VIH in the related technologies, and corresponds to the rising edge of the logic level. The second commutation voltage is a commutation voltage for triggering a falling edge, similar to VIL in the related technologies, and corresponds to the falling edge of the logic level. In the present application, the first commutation voltage and the second commutation voltage respectively correspond to the first angle and the second angle, and the first angle and the second angle may be actual angles detected by the position sensor. Specifically, the method provided in the present application can be used when the motor is rotating smoothly. At this time, an angular velocity of the motor rotation tends to be stable, and the first angle and the second angle can be calculated based on the current angle of the motor and a time difference between the appearances of the first and second commutation voltages. For example, the first angle corresponding to the first commutation voltage can be artificially set, and then the second angle corresponding to the second commutation voltage can be calculated according to the time difference between the first commutation voltage and the second commutation voltage in combination with the angular velocity of the rotor rotation. A difference between the first angle and the second angle corresponds to an angle value of the second half period. A complete period is 360 degrees, so an angle value of the first half period can also be known. Then the angle correction of the logic level may be performed according to the first angle and the second angle. For example, the rising edge or the falling edge of the logic level can be adjusted so that the angles of the first half period and the second half period are both equal to 180°. In the related technologies, the motor is energized according to the logic level. In the present application, the logic level is adjusted, thereby solving the problem of fluctuations in motor speed caused by uneven commutation voltage.

Optionally, the obtaining unit 10 configured to obtain an analog voltage output by a position sensor for a winding of the motor includes: analog sampling voltage signals output by a Hall sensor as the analog voltage. Specifically, in this embodiment, the position sensor is a Hall sensor. When the Hall sensor approaches a magnetic conductive object, a magnetic field inside the Hall sensor changes, Due to the Hall effect, different Hall voltages are generated, so that it can be judged whether there is a magnetic conductive object approaching. When the Hall sensor is used to measure the rotation of the motor, the Hall sensor can be fixedly installed. A magnetic steel with good magnetic conductivity is installed on a rotating part of the motor. During the rotation, every time the magnetic steel approaches the Hall sensor, the Hall sensor considers that the motor has completed one rotation, so as to monitor the rotation of the motor.

Optionally, the generating unit 30 configured to generate a logic level according to the analog voltage, the first commutation voltage and the second commutation voltage includes: determining a rising edge of the logic level according to the first commutation voltage, wherein when the analog voltage is in a rising region, a logic level corresponding to a part of the analog voltage greater than the first commutation voltage is set to a high level, and a logic level corresponding to a part of the analog voltage less than the first commutation voltage is set to a low level;

and/or, determining a falling edge of the logic level according to the second commutation voltage, wherein when the analog voltage is in a falling region, a logic level corresponding to a part of the analog voltage greater than the second commutation voltage is set to a high level, and a logic level corresponding to a part of the analog voltage less than the second commutation voltage is set to a low level.

Specifically, in this embodiment, the analog voltage is converted into a logic level. A low voltage part of the analog voltage corresponds to a low level part of the logic level, and a high voltage part of the analog voltage corresponds to a high level part of the logic level. A part of the analog voltage that rises from low voltage to high voltage is the rising region, such as a rising arc part, where the VIH located, in the waveform of the position sensor in FIG. 1. A part of the analog voltage that decreases from high level to low level is the falling region, such as a falling arc part, where the VIH located, in the waveform of the position sensor in FIG. 1. The first commutation voltage corresponds to the rising edge of the logic level, and the second commutation voltage corresponds to the falling edge of the logic level. The analog voltage can be converted into a digital logic level by setting the first commutation voltage and the second commutation voltage. The logic level only includes high level and low level. The transition edge of a transition from low level to high level is a rising edge, and the transition edge of a transition from high level to low level is a falling edge. The method of generating logic levels used in this part can be consistent with the method of generating logic levels in the related technologies.

Optionally, the second commutation voltage is equal to a power supply voltage. The power supply voltage is VDD in FIG. 1, which is the maximum voltage that the position sensor can detect. Please refer to FIG. 3. Because the second commutation voltage is set to the power supply voltage VDD, after the angle correction is performed on the logic level in the present application, the falling edge will be consistent with the actual rotor position, thereby preventing a failure to accurately control of the energization of the winding of the motor resulted from the inconsistency between the falling edge and the actual rotor position, and preventing fluctuations in motor rotation.

Specifically, the correcting unit 40 configured to perform angle correction on the logic level according to a first angle corresponding to the first commutation voltage and a second angle corresponding to the second commutation voltage includes:

setting an angle corresponding to a falling edge of the logic level to 0°; and advancing an angle corresponding to a rising edge of the logic level by 180°-X, wherein the X is the first angle corresponding to the first commutation voltage.

Specifically, please continue to refer to FIG. 3, in the present application, because the second commutation voltage is set as a working voltage VDD, it is ensured that the falling edge of the logic level is consistent with the actual rotor position. In order to ensure that the rising edge of the logic level is consistent with the actual rotor position, the first commutation voltage V1 is set. V1 can be smaller than VIH in the related technologies. A motor rotor angle corresponding to the falling edge in the logic level is 0°, and the angle corresponding to V1 is X, so an angle difference between the second half period and the first angle is 180°-X. In order to make the angle of the second half period equal to 180°, an angle corresponding to the rising edge of the logic level is set to be advanced by 180°-X, so that the rising edge of the logic level can also coincide with a rising edge of the actual rotor position, and thus the angles of the first half period and the second half period are both equal to 180°.

Optionally, the detecting system further includes: a power supply unit 50 configured to energize the winding of the motor according to a corrected logic level. In the present application, the actual rotor position is consistent with the logic level, which solves the problem of uneven commutation voltage caused by the delay of the transition edges in the related technologies, avoids fluctuations in the rotation of the motor, realizes a uniform commutation current of the motor, and ensures a stable motor speed.

The present application provides a method and system for detecting a logic level of a rotor of a motor, and a motor, which may accurately identify the logic level corresponding to the motor rotor, improve uniformity of a commutation voltage and prevent fluctuations in motor speed.

The above are only preferred embodiments of the present application and are not used to limit the present application. For those skilled in the art, the present application can have various modifications and changes. Any modification, equivalent replacement, improvement and so forth made within the spirit and principle of the present application shall be included in the protection scope of the present application.

What is claimed is:
1. A method for detecting a logic level of a rotor of a motor, comprising:
    obtaining an analog voltage, through a method of analog sampling, output by a position sensor for a winding of the motor, wherein the analog voltage is a continuous voltage;
    setting a first commutation voltage and a second commutation voltage;
    converting the analog voltage into a logic level according to the first commutation voltage and the second commutation voltage; and
    performing angle correction on the logic level according to a first angle corresponding to the first commutation voltage and a second angle corresponding to the second commutation voltage,
    wherein the first commutation voltage is a commutation voltage for triggering a rising edge, and the second commutation voltage is a commutation voltage for triggering a falling edge;

wherein the converting the analog voltage into a logic level according to the first commutation voltage and the second commutation voltage comprises:
determining a rising edge of the logic level according to the first commutation voltage, wherein when the analog voltage is in a rising region, a logic level corresponding to a part of the analog voltage greater than the first commutation voltage is set to a high level, and a logic level corresponding to a part of the analog voltage less than the first commutation voltage is set to a low level; and
determining a falling edge of the logic level according to the second commutation voltage, wherein when the analog voltage is in a falling region, a logic level corresponding to a part of the analog voltage greater than the second commutation voltage is set to a high level, and a logic level corresponding to a part of the analog voltage less than the second commutation voltage is set to a low level.

2. The method for detecting a logic level of a rotor of a motor according to claim 1, wherein the obtaining an analog voltage, through a method of analog sampling, output by a position sensor for a winding of the motor comprises:
analog sampling voltage signals output by a Hall sensor as the analog voltage,
wherein the position sensor is the Hall sensor.

3. The method for detecting a logic level of a rotor of a motor according to claim 1, wherein the second commutation voltage is equal to a power supply voltage.

4. The method for detecting a logic level of a rotor of a motor according to claim 1, wherein the performing angle correction on the logic level according to a first angle corresponding to the first commutation voltage and a second angle corresponding to the second commutation voltage comprises:
setting an angle corresponding to a falling edge of the logic level to 0°; and
advancing an angle corresponding to a rising edge of the logic level by 180°-X,
wherein the X is the first angle corresponding to the first commutation voltage.

5. The method for detecting a logic level of a rotor of a motor according to claim 1, further comprising:
energizing the winding of the motor according to a corrected logic level.

6. A system for detecting a logic level of a rotor of a motor, comprising:
a processor; and
a memory for storing instructions executable by the processor;
wherein the processor is configured to:
obtain an analog voltage, through a method of analog sampling, output by a position sensor for a winding of the motor, wherein the analog voltage is a continuous voltage;
set a first commutation voltage and a second commutation voltage;
converting the analog voltage into a logic level according to the first commutation voltage and the second commutation voltage; and
perform angle correction on the logic level according to a first angle corresponding to the first commutation voltage and a second angle corresponding to the second commutation voltage,
wherein the first commutation voltage is a commutation voltage for triggering a rising edge, and the second commutation voltage is a commutation voltage for triggering a falling edge;
wherein the processor is configured to:
determine a rising edge of the logic level according to the first commutation voltage, wherein when the analog voltage is in a rising region, a logic level corresponding to a part of the analog voltage greater than the first commutation voltage is set to a high level, and a logic level corresponding to a part of the analog voltage less than the first commutation voltage is set to a low level; and
determine a falling edge of the logic level according to the second commutation voltage, wherein when the analog voltage is in a falling region, a logic level corresponding to a part of the analog voltage greater than the second commutation voltage is set to a high level, and a logic level corresponding to a part of the analog voltage less than the second commutation voltage is set to a low level.

7. The system for detecting a logic level of a rotor of a motor according to claim 6, wherein the processor is configured to: analog sample voltage signals output by a Hall sensor as the analog voltage,
wherein the position sensor is the Hall sensor.

8. The system for detecting a logic level of a rotor of a motor according to claim 6, wherein the second commutation voltage is equal to a power supply voltage.

9. The system for detecting a logic level of a rotor of a motor according to claim 6, wherein the processor is configured to:
set an angle corresponding to a falling edge of the logic level to 0°; and
advance an angle corresponding to a rising edge of the logic level by 180°-X,
wherein the X is the first angle corresponding to the first commutation voltage.

10. The system for detecting a logic level of a rotor of a motor according to claim 6, wherein the processor is further configured to: energize the winding of the motor according to a corrected logic level.

11. A motor, comprising the system for detecting a logic level of a rotor of a motor according to claim 6.

* * * * *